(12) United States Patent
Hwang et al.

(10) Patent No.: US 8,208,636 B2
(45) Date of Patent: Jun. 26, 2012

(54) METHOD FOR TRANSMITTING/RECEIVING ENCRYPTION INFORMATION IN A MOBILE BROADCAST SYSTEM, AND SYSTEM THEREFOR

(75) Inventors: Sung-Oh Hwang, Yongin-si (KR); Byung-Rae Lee, Yongin-si (KR); Kook-Heui Lee, Yongin-si (KR); Bo-Sun Jung, Seongnam-si (KR); Jong-Hyo Lee, Pyeongtaek-si (KR); Jae-Kwon Oh, Seoul (KR); Jae-Yong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1042 days.

(21) Appl. No.: 11/598,236

(22) Filed: Nov. 13, 2006

(65) Prior Publication Data

US 2007/0133805 A1 Jun. 14, 2007

(30) Foreign Application Priority Data

Nov. 10, 2005 (KR) .............................. 2005-0107760

(51) Int. Cl.
*H04L 9/08* (2006.01)
(52) U.S. Cl. ........................................ 380/278; 380/247
(58) Field of Classification Search .................. 380/270, 380/278; 713/163, 171
See application file for complete search history.

(56) References Cited

U.S. PATENT DOCUMENTS

| | | | |
|---|---|---|---|
| 6,973,189 B1 | 12/2005 | Bodin | |
| 7,299,362 B2 | 11/2007 | Shen et al. | |
| 2002/0053082 A1* | 5/2002 | Weaver et al. | 725/46 |
| 2004/0111740 A1 | 6/2004 | Seok et al. | |
| 2004/0137885 A1* | 7/2004 | Sarkkinen et al. | 455/414.1 |
| 2006/0030312 A1* | 2/2006 | Han et al. | 455/432.1 |
| 2006/0206708 A1* | 9/2006 | Son et al. | 713/163 |
| 2007/0124359 A1* | 5/2007 | Hwang et al. | 709/200 |
| 2008/0301782 A1* | 12/2008 | Han et al. | 726/4 |

FOREIGN PATENT DOCUMENTS

| | | |
|---|---|---|
| KR | 10-2002-0083812 A | 11/2002 |
| KR | 10-2004-0046676 A | 6/2004 |
| KR | 10-2004-0060950 A | 7/2004 |
| RU | 2 150 790 C1 | 10/2000 |

(Continued)

OTHER PUBLICATIONS

OMA (Open Mobile Alliance) ; Mobile Broadcast Services Architecture; OMA; Version 1.0; May 05, 2005; Retrieved date Jun. 25, 2010; pp. 1-87.*

(Continued)

*Primary Examiner* — Samson Lemma
(74) *Attorney, Agent, or Firm* — Roylance, Abrams, Berdo & Goodman, L.L.P.

(57) ABSTRACT

A system and method for transmitting/receiving encryption information in a mobile broadcast system supporting broadcast service (BCAST) are provided. In the mobile broadcast system, a BCAST Subscription Management (BSM) manages subscriber information of a terminal, and transmits to a BCAST Service Distribution/Adaptation (BSD/A) a first delivery message including a Registration Key Material (RKM) provided for registration of the broadcast service of the terminal and including at least one service or content's identifier. The BSD/A transmits to the BSM a first delivery confirmation message including information indicating success/fail in receipt of the first delivery message, and transmits the RKM to the terminal.

16 Claims, 11 Drawing Sheets

FOREIGN PATENT DOCUMENTS

| | | |
|---|---|---|
| RU | 2173505 C2 | 2/2010 |
| WO | WO 96/13920 | 5/1996 |
| WO | WO 99/39525 A1 | 8/1999 |
| WO | WO 00/54456 | 9/2000 |
| WO | WO 03/098868 A1 | 11/2003 |
| WO | WO 2004/075584 A1 | 9/2004 |
| WO | WO 2005/004456 A1 | 1/2005 |

OTHER PUBLICATIONS

OMA (Open Mobile Alliance) ; Mobile Broadcast Services Architecture; OMA; Version 1.0; Apr. 20, 2005; Retrieved date Jun. 25, 2010; pp. 1-88; XP-002439100.*

OMA (Open Mobile Alliance) ; DRM Specificiation; OMA; Version 2.0; Apr. 20, 2005; Retrieved date Jun. 25, 2010; pp. 1-145; XP-002418067.*

Open Mobile Alliance, "Mobile Broadcast Services Architecture—Draft Version 1.0-OMA-AD-BCAST-V10-20050420-D", XP-002418066, Apr. 20, 2005.

Open Mobile Alliance, "Service and Content Protection for Mobile Broadcast Services—Draft Version 1.0-OMA-TS-BCASTSvc-CntProtection-V1-20050829-D", XP-002418068, Aug. 29, 2005.

Open Mobile Alliance, "DRM Specification—Candidate Version 2.0 (OMA-DRM-V2_0-20040716-C)", XP-002337407, Jul. 16, 2005.

* cited by examiner

METHOD FOR TRANSMITTING/RECEIVING ENCRYPTION INFORMATION IN A MOBILE BROADCAST SYSTEM, AND SYSTEM THEREFOR

CROSS-REFERENCE TO RELATED APPLICATIONS

This application claims the benefit under 35 U.S.C. §119 (a) of Korean Patent application Serial No. 2005-107760 filed in the Korean Intellectual Property Office on Nov. 10, 2005, the entire disclosure of which is hereby incorporated by reference.

BACKGROUND OF THE INVENTION

1. Field of the Invention

The present invention relates generally to an encryption method and apparatus in a mobile broadcast system. More particularly, the present invention relates to a method for transmitting/receiving encryption information for service/content protection in a mobile broadcast system, and a system therefor.

2. Description of the Related Art

In general, Broadcast (BCAST) Service refers to a technology in which a server, managing a broadcast service, broadcasts encrypted service and multiple terminals receive the encrypted broadcast service. Each of the terminals decrypts the encrypted service provided from the server using its own encryption key, thereby allowing the user to enjoy the corresponding service.

The BCAST service may be a charged service. To meet the demand for copyright protection technology for preventing illegal copying and distribution of the service, 3rd Generation Partnership Project (3GPP) or Open Mobile Alliance (OMA), which is a standards group, has introduced a Digital Rights Management (DRM) technology based on flexibility and facility for Right Object (RO) of the user. However, the mobile broadcast system gives no definition of an encryption method for service protection between entities and of interfaces between the entities, so there is a need to define the encryption method.

Accordingly, there is a need for an improved apparatus and method for transmitting/receiving encryption information in a mobile broadcast system.

SUMMARY OF THE INVENTION

Exemplary embodiments of the present invention address at least the above problems and/or disadvantages and provide at least the advantages described below. Accordingly, an aspect of the present invention is to provide a method for transmitting/receiving encryption information between entities in a mobile broadcast system, and a system therefor.

According to one exemplary aspect of the present invention, there is provided a method for transmitting/receiving encryption information in a mobile broadcast system supporting broadcast service (BCAST), wherein the mobile broadcast system includes a BCAST Subscription Management (BSM) for managing subscriber information of a terminal and generating an encryption key with which the terminal decrypts at least one encrypted service or content, and a BCAST Service Distribution/Adaptation (BSD/A) for transmitting the encryption key. The method comprises transmitting by the BSD/A to the BSM a first request message including the at least one service or content's identifier and requesting delivery of a Registration Key Material (RKM) for registration of the broadcast service of the terminal and upon receiving the first request message, the BSM transmitting a first request response message including the RKM to the BSD/A.

In an exemplary embodiment, the method further comprises transmitting by the BSD/A to the BSM a second request message including the at least one service or content's identifier and requesting delivery of a Long-Term Key Message (LTKM) provided to the terminal during subscription of a broadcast service and upon receiving the second request message, the BSM transmitting a second request response message including the LTKM to the BSD/A.

In an exemplary embodiment, the method further comprises transmitting by the BSD/A to the BSM a third request message including the at least one service or content's identifier and requesting delivery of a Short-Term Key Message (STKM) including a Traffic Encryption Key (TEK) used for decryption of the particular broadcast service by the terminal and upon receiving the third request message, the BSM transmitting a third request response message including the STKM to the BSD/A.

According to another exemplary aspect of the present invention, there is provided a method for transmitting/receiving encryption information in a mobile broadcast system supporting broadcast (BCAST) service (BCAST), wherein the mobile broadcast system includes a BCAST Subscription Management (BSM) for managing subscriber information of a terminal and generating an encryption key with which the terminal decrypts at least one encrypted service or content, and a BCAST Service Distribution/Adaptation (BSD/A) for transmitting the encryption key. The method comprises transmitting by the BSM to the BSD/A a first delivery message including the at least one service or content's identifier and including a Registration Key Material (RKM) for registration of the terminal and the BSD/A transmitting to the BSM a first delivery confirm message including information indicating success/fail in receipt of the first delivery message.

In an exemplary embodiment, the method further includes transmitting by the BSM to the BSD/A a second delivery message including the at least one service or content's identifier and including a Long-Term Key Message (LTKM) provided to the terminal during subscription of a broadcast service and the BSD/A transmitting to the BSM a second delivery confirm message including information indicating success/fail in receipt of the second delivery message.

In an exemplary embodiment, the method further comprises transmitting by the BSM to the BSD/A a third delivery message including the at least one service or content's identifier and including a Short-Term Key Message (STKM) including a Traffic Encryption Key (TEK) used for decryption of the broadcast service by the terminal and the BSD/A transmitting to the BSM a third delivery confirm message including information indicating success/fail in receipt of the third delivery message.

According to further another exemplary aspect of the present invention, there is provided a mobile broadcast system supporting broadcast service (BCAST). An exemplary mobile broadcast system includes a BCAST Subscription Management (BSM) for managing subscriber information of a terminal, and for transmitting to a BCAST Service Distribution/Adaptation (BSD/A) a first delivery message including a Registration Key Material (RKM) provided for registration of the broadcast service of the terminal and including at least one service or content's identifier; and the BSD/A for transmitting to the BSM a first delivery confirm message including information indicating success/fail in receipt of the first delivery message, and transmitting the RKM to the terminal.

In an exemplary embodiment, the BSM transmits to the BSD/A a second delivery message including a Long-Term Key Message (LTKM) provided to the terminal during subscription of a particular broadcast service and also including at least one service or content's identifier; and the BSD/A transmits to the BSM a second delivery confirm message including information indicating success/fail in receipt of the second delivery message, and transmits the LTKM to the terminal.

In an exemplary embodiment, the BSM transmits to the BSD/A a third delivery message including a Short-Term Key Message (STKM) including a Traffic Encryption Key (TEK) used for decryption of the broadcast service by the terminal and also including at least one service or content's identifier; and the BSD/A transmits to the BSM a third delivery confirm message including information indicating success/fail in receipt of the third delivery message, and transmits the STKM to the terminal.

According to yet another exemplary aspect of the present invention, there is provided a mobile broadcast system supporting broadcast service (BCAST). An exemplary mobile broadcast system includes a BCAST Service Distribution/Adaptation (BSD/A) for transmitting to a BCAST Subscription Management (BSM) a first request message requesting delivery of a Registration Key Material (RKM) for registration of the broadcast service of a terminal and including at least one service or content's identifier, and upon receiving the RKM from the BSM, transmitting the RKM to the terminal and the BSM for managing subscriber information of the terminal, and upon receiving the first request message, transmitting a first request response message including the RKM to the BSD/A.

In an exemplary embodiment, the BSD/A transmits to the BSM a second request message requesting delivery of a Long-Term Key Message (LTKM) provided to the terminal during subscription of a broadcast service and including at least one service or content's identifier, and upon receiving the LTKM from the BSM, transmits the LTKM to the terminal and upon receiving the second request message, the BSM transmits a second request response message including the LTKM to the BSD/A.

In an exemplary embodiment, the BSD/A transmits to the BSM a third request message requesting delivery of a Short-Term Key Message (STKM) including a Traffic Encryption Key (TEK) used for decryption of the broadcast service by the terminal and including at least one service or content's identifier, and upon receiving the STKM from the BSM, transmits the STKM to the terminal and upon receiving the third request message, the BSM transmits a third request response message including the STKM to the BSD/A.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Exemplary embodiments of the present invention will now be described in detail with reference to the drawings.

In the following detailed description, exemplary embodiments of the present invention for achieving the above and other objects will be presented. Although names of the entities defined in 3rd Generation Partnership Project (3GPP) which is the asynchronous mobile communication standard, or Open Mobile Alliance (OMA) which is the terminal application standard, will be used for convenience, the standards and names should not limit the scope of the present invention, and the present invention can be applied to the systems having a similar technical background.

The present invention proposes a method and system for protecting a broadcast service. Specifically, the present invention proposes a structure for service protection and a function of each entity in the broadcast network. To this end, the present invention stably delivers a service broadcasted to a terminal according to structure and function of each entity, including the terminal, thereby allowing the terminal to reproduce the service.

An exemplary mobile broadcast system and a message flow therein will now be described in detail with reference to FIG. 1.

Figure 1:
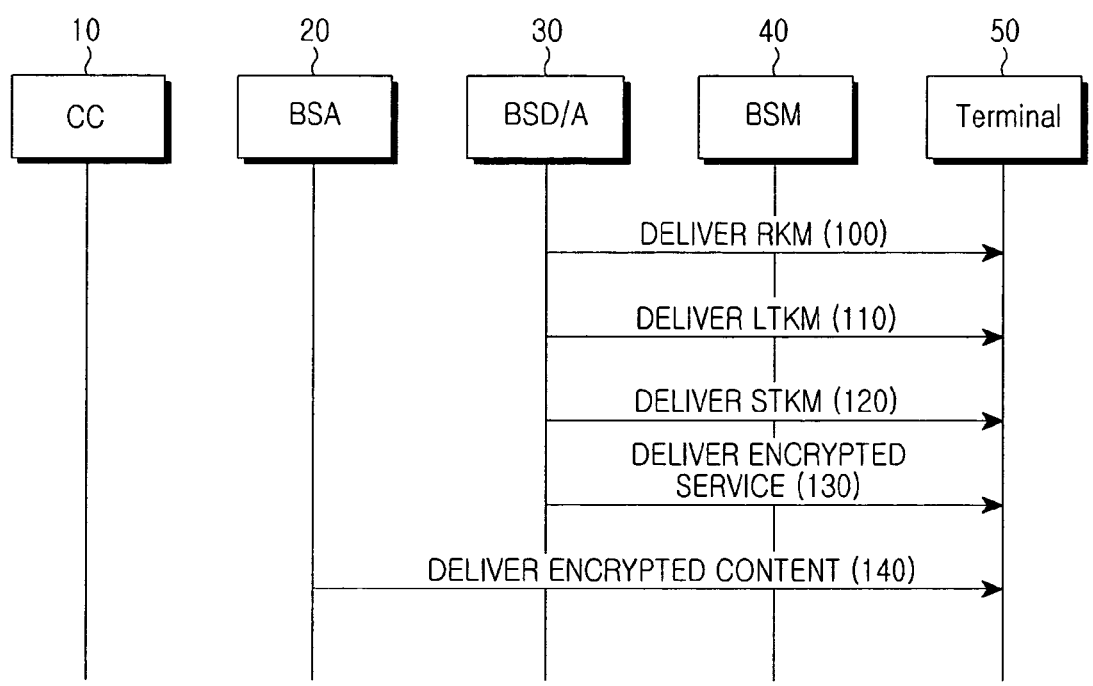
FIG. 1 is a signaling diagram illustrating a signal flow of encryption information in a mobile broadcast system according to an exemplary embodiment of the present invention.

FIG. 1 is a signaling diagram illustrating a signal flow of encryption information in a mobile broadcast system according to an exemplary embodiment of the present invention.

A function of each entity in FIG. 1 will first be described. A Content Creation (CC) 10 is a provider of Broadcast Service (BCAST) service. The BCAST service can include audio/video broadcast service, music/data file download service, and the like.

A BCAST Service Application (BSA) 20 processes data of the BCAST service provided from the Content Creation 10 in a form appropriate for the BCAST network, generates BCAST service data, and generates standardized metadata necessary for mobile broadcast guide.

A BCAST Service Distribution/Adaptation (BSD/A) 30 establishes a carrier over which it will transmit the BCAST service data provided from the BSA 20, determines a delivery schedule of the BCAST service, and generates a mobile broadcast guide.

A BCAST Subscription Management (BSM) 40 manages subscription information and service provisioning information for reception of the BCAST service, and information on an apparatus for receiving the BCAST service.

A Terminal 50 is a terminal capable of receiving the BCAST service, and can be connected to a cellular network according to terminal capability. It will be assumed herein that the Terminal 50 is a terminal that can be connected to the cellular network.

A description will now be made of Content Protection and Service Protection according to an exemplary embodiment of the present invention. The Content Protection protects the broadcasted files and streams. Rights Management for contents is performed by a terminal. The protected contents are encrypted by the BSA 20 and then broadcast to a Terminal 50. The Service Protection protects the broadcasted files and streams, and encryption on the contents is performed by the BSD/A 30. The Content Protection is similar to the Service Protection in terms of protecting the contents. However, unlike the Service Protection, the Content Protection differs according to use/nonuse of DRM. That is, the Content Protection includes a function of managing a valid interval of the contents that the terminal has received, and possibility of copying the contents. For the Content Protection, the contents are encrypted by the BSA 20 and then broadcast to a Terminal 50.

For both the Service Protection and the Content Protection, the BSM 40 performs subscription management on the terminal. As the broadcast service is delivered to the Terminal 50 through the entities for each function, a user of Terminal 50 can enjoy the service. Herein, a message related to the Service Protection and the Content Protection will be called 'encryption information'.

An exemplary method for delivering an encryption information message will now be described with reference to FIG. 1. In order to use the broadcasted service and contents, a Terminal 50 should register in the BSM 40 and then receive a Registration Key Material (RKM) in step 100. Thereafter, if the Terminal 50 subscribes to a particular broadcast service, it should acquire a Long-Term Key Message (LTKM) in step 110. In addition, the Terminal 50 should acquire a Short-Term Key Message (STKM) used for actually decrypting the encrypted service and contents in step 120. The Terminal 50 can decrypt the LTKM using the RKM, and can decrypt the STKM using a Service Encryption Key (SEK) obtained as a result of the decryption. The STKM includes a Traffic Encryption Key (TEK), and the Terminal 50 can actually decrypt the encrypted service and contents using the TEK. It is shown in FIG. 1 that the encryption information messages such as RKM, LTKM and STKM are delivered from the BSD/A 30 to the Terminal 50 over a broadcast channel. A Terminal 50 capable of using an interaction channel, although not shown in FIG. 1, can alternatively receive the RKM and the LTKM through direct communication with the BSM 40.

A description will now be made of elements of exemplary messages used for delivery of encryption information.

Table 1 to Table 6 below show schema tables of the messages described above, and show in regular sequence definitions of the message formats used in exemplary embodiments of the present invention, and a description of each field is specified in the tables.

TABLE 1

Request Message Format Req-1

| Name | Type | Category | Cardinality | Description | Data Type |
|------|------|----------|-------------|-------------|-----------|
| Tag | E | M | 1 | Type of message | Integer |
| Version | E | O | 1 | Version of standard supported by this message | Integer |
| Message ID | E | M | 1 | ID of this message | String |
| Destination | E | M | 1 | Message destination ID | String |
| Source | E | M | 1 | Message source ID | String |
| Service/Content Info. | E | M | 1 | Associated information such as Service/content ID | String |
| Time | E | O | 1 | Message-delivered Time | String |

TABLE 2

Response Message Format Res-1

| Name | Type | Category | Cardinality | Description | Data Type |
|------|------|----------|-------------|-------------|-----------|
| Tag | E | M | 1 | Type of message | Integer |
| Version | E | O | 1 | Version of standard supported by this message | Integer |
| Message ID | E | M | 1 | ID of request message | String |
| Destination | E | M | 1 | Message destination ID | String |
| Source | E | M | 1 | Message source ID | String |
| Service/Content Info. | E | O | 1 | Associated information such as Service/content ID | String |
| Status | E | M | 1 | Response result of message | Integer |
| Data | E | O | 1 | Information intended to be delivered to destination | Binary |
| Time | E | O | 1 | Message-delivered time | String |

TABLE 3

Response Message Format Res-2

| Name | Type | Category | Cardinality | Description | Data Type |
|---|---|---|---|---|---|
| Tag | E | M | 1 | Type of message | Integer |
| Message ID | E | M | 1 | ID of request message | String |
| Status | E | M | 1 | Response result of message | Integer |
| Data | E | O | 1 | Information intended to be delivered to destination | Binary |

TABLE 4

Delivery Message Format Tra-1

| Name | Type | Category | Cardinality | Description | Data Type |
|---|---|---|---|---|---|
| Tag | E | M | 1 | Type of message | Integer |
| Version | E | O | 1 | Version of standard supported by this message | Integer |
| Target Terminal | E | M | 1 | Target terminal of this message | String |
| Message ID | E | M | 1 | ID of this message | String |
| Destination | E | M | 1 | Message destination ID | String |
| Source | E | M | 1 | Message source ID | String |
| Service/Content Info. | E | M | 1 | Associated information such as Service/content ID | String |
| Data | E | M | 1 | Information intended to be delivered to destination | Binary |
| Time | E | O | 1 | Message-delivered time | String |

TABLE 5

Confirm Message Format Con-1

| Name | Type | Category | Cardinality | Description | Data Type |
|---|---|---|---|---|---|
| Tag | E | M | 1 | Type of message | Integer |
| Version | E | O | 1 | Version of standard supported by this message | Integer |
| Message ID | E | M | 1 | ID of delivery message | String |
| Destination | E | M | 1 | Message destination ID | String |
| Source | E | M | 1 | Message source ID | String |
| Service/Content Info. | E | O | 1 | Associated information such as Service/content ID | String |
| Status | E | M | 1 | Confirmation result of message | Integer |
| Time | E | O | 1 | Message-delivered time | String |

TABLE 6

Confirm Message Format Con-2

| Name | Type | Category | Cardinality | Description | Data Type |
|---|---|---|---|---|---|
| Tag | E | M | 1 | Type of message | Integer |
| Message ID | E | M | 1 | ID of delivery message | String |
| Status | E | M | 1 | Confirmation result of message | Integer |

In the tables, 'Name' indicates names of elements and attributes constituting the corresponding message. 'Type' indicates whether the corresponding name corresponds to the type of an element or an attribute. Each element has values of E1, E2, E3 and E4. E1 means an upper element for the whole message, E2 indicates a sub-element of E1, E3 indicates a sub-element of E2, and E4 indicates a sub-element of E3. The attribute is indicated by A, and A indicates an attribute of the corresponding element. For example, A under E1 indicates an attribute of E1. 'Category' is used for indicating whether a corresponding element or attribute is mandatory, and has a value M if the value is mandatory, and a value O if the value is optional. 'Cardinality' indicates relations between the elements, and has values of {0, 0 . . . 1, 1, 0 . . . n, 1 . . . n}, where "0" means an optional relation, "1" means a mandatory relation, and 'n' means the possibility of having a plurality of values. For example, '0 . . . n' means the possibility that there is no corresponding element or there are n corresponding elements. 'Description' defines the meaning of the corresponding element or attribute. 'Data Type' indicates a data type of the corresponding element or attribute.

In Table 7 below, the type of each message is distinguished using Tag used in the message formats defined in Table 1 to Table 6. However, the Tag values defined herein simply distinguish the message types, and are not always fixed, but subject to change according to circumstances.

In the Response Message and the Confirm Message, Status='0' indicates that the Request and Delivery Messages were successfully received and the associated item was performed, and Status=' 1' indicates that reception of the Request and Delivery Messages was failed and execution of the associated item was failed.

Each message can obtain improvement in performance using Res-2 or Con-2, which is a shortened message provided using Message ID as shown in 'Applied Message Format' of Table 7 below.

TABLE 7

Message Type and Applied Message Format Based on Tag

| Tag | Message Type | Applied Message Format | Delivery Info. |
| --- | --- | --- | --- |
| 1 | TEK Request Message | Req-1 | TEK |
| 2 | TEK Request Response Message | Res-1 or Res-2 | |
| 3 | TEK Delivery Message | Tra-1 | |
| 4 | TEK Delivery Confirm Message | Con-1 or Con-2 | |
| 5 | SKM Request Message | Req-1 | SKM |
| 6 | SKM Request Response Message | Res-1 or Res-2 | |
| 7 | SKM Delivery Message | Tra-1 | |
| 8 | SKM Delivery Confirm Message | Con-1 or Con-2 | |
| 9 | LKM Request Message | Req-1 | LKM |
| 10 | LKM Request Response Message | Res-1 or Res-2 | |
| 11 | LKM Delivery Message | Tra-1 | |
| 12 | LKM Delivery Confirm Message | Con-1 or Con-2 | |
| 13 | RKM Request Message | Req-1 | RKM |
| 14 | RKM Request Response Message | Res-1 or Res-2 | |
| 15 | RKM Delivery Message | Tra-1 | |
| 16 | RKM Delivery Confirm Message | Con-1 or Con-2 | |

Figure 2A:
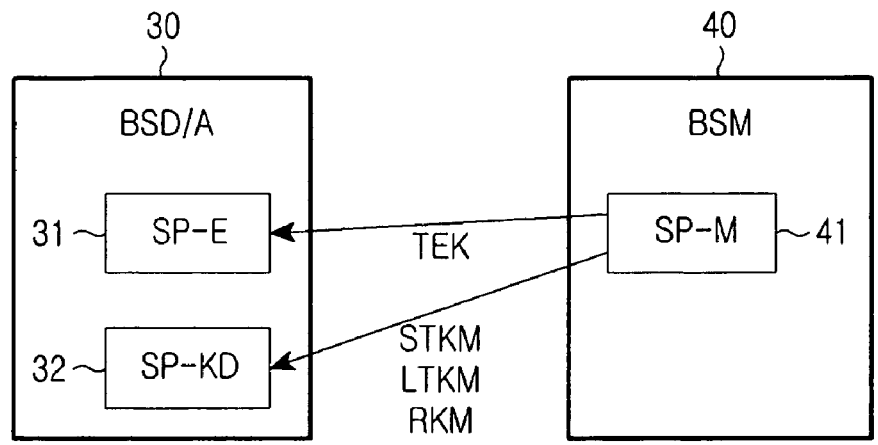
FIGS. 2A and 2B are diagrams illustrating an information flow between entities of a server according to an exemplary embodiment of the present invention, for Service Protection and Content Protection, respectively.
Figure 2B:
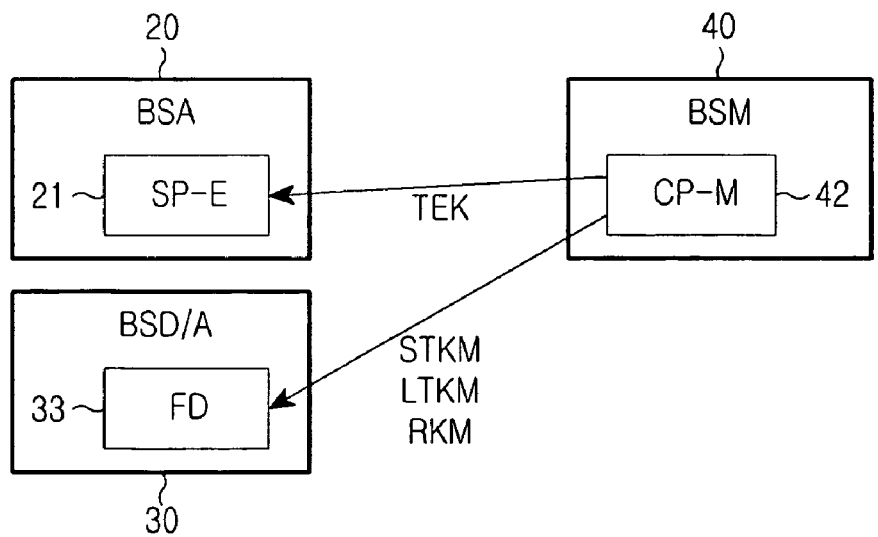

Exemplary embodiments of the present invention provide a method for exchanging encryption information such as TEK, STKM, LTKM and RKM related to the Service Protection and Content Protection between the BSA 20 and the BSM 40, and between the BSD/A 30 and the BSM 40. FIGS. 2A and 2B show the information exchanged between entities, and the detailed examples will be described with reference to the accompanying drawings.

FIGS. 2A and 2B are diagrams illustrating an information flow between entities of a server according to an exemplary embodiment of the present invention, for Service Protection and Content Protection, respectively. Referring to FIGS. 2A and 2B, an entity for performing the Service Protection includes a Service Protection-Encryption (SP-E) 31 and a Service Protection-Key Distribution (SP-KD) 32 in the BSD/A 30. The SP-E 31 serves to encrypt the service, and the SP-KD 32 serves to transmit the associated encryption key information up to a Terminal 50 over a broadcast channel. The BSM 40, including a Service Protection-Management (SP-M) 41 therein, manages subscription of the terminal and generation of the encryption key.

For the Content Protection, a File Distribution (FD) 33 in the BSD/A 30 receives the encryption key information delivered from the BSM 40 and delivers the received encryption key information to a terminal over a broadcast channel. The BSM 40, including a Content Protection-Management (CP-M) 42 therein, manages subscription of the terminal and generation of the encryption key. The BSA 20, including a Content Protection-Encryption (CP-E) 21 therein, manages encryption of the contents.

Figure 3A:
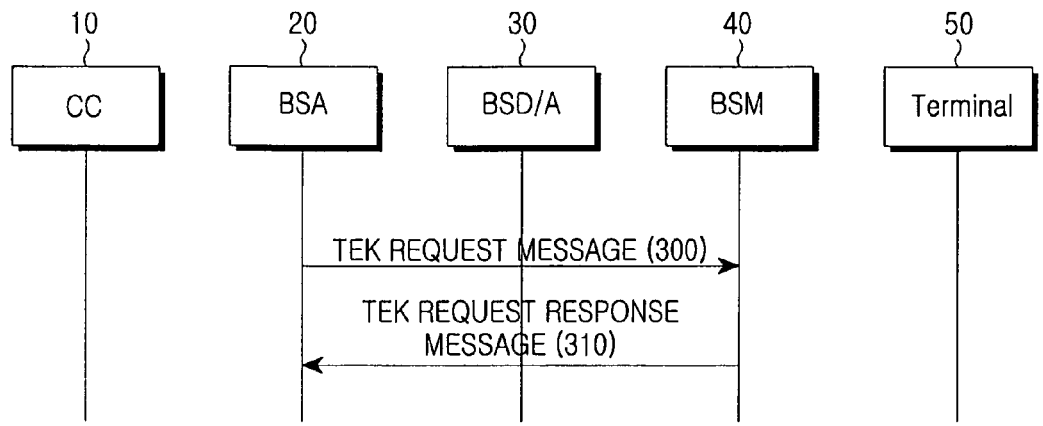
FIGS. 3A and 3B are diagrams illustrating an interfacing method between a BSA and a BSM for Content Protection according to an exemplary embodiment of the present invention.
Figure 3B:
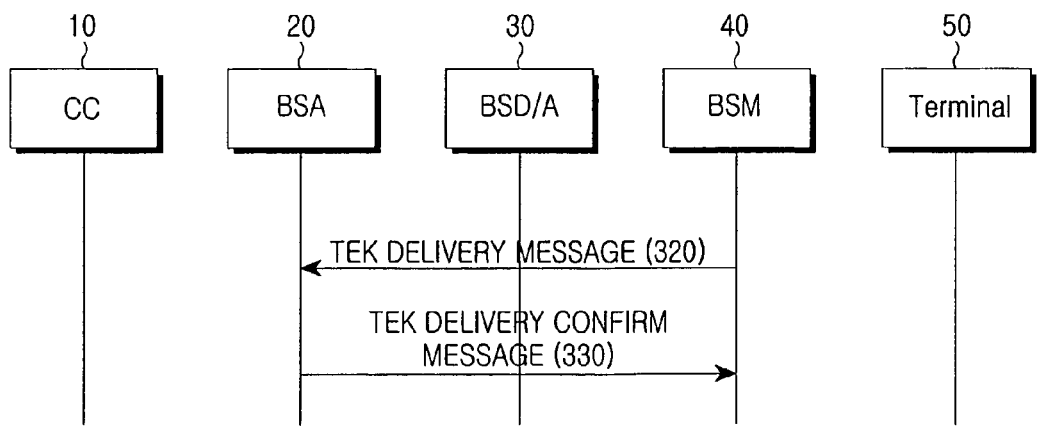

FIGS. 3A and 3B are diagrams illustrating an interfacing method between a BSA 20 and a BSM 40 for Content Protection according to an exemplary embodiment of the present invention, and the information transmitted for the Content Protection will be described. In an exemplary Content Protection method, because encryption is performed in the BSA 20, the encryption key generated by the BSM 40 is delivered to the BSA 20. Because the key used for encrypting the contents in the mobile broadcast system is TEK, the TEK generated by the BSM 40 should be delivered to the BSA 20.

As shown in FIG. 3A, an exemplary delivery method starts with a TEK Request Message transmitted from the BSA 20 in step 300, and Tag indicating the TEK Request Message is set to '1'. A Destination field indicates the BSM 40 and a Source field indicates the BSA 20. Upon receipt of the TEK Request Message, the CP-M 42 in the BSM 40 transmits a TEK Request Response Message with Tag='2' in step 310. If a Status field of the Response is set to '0', TEK is stored in a Data field before being transmitted, and if the TEK is not transmitted, the Status field is set to '1' before being transmitted.

In the method of FIG. 3B, the BSM 40 transmits TEK without a request from the BSA 20. In an exemplary embodiment, the CP-M 42 in the BSM 40 transmits a TEK Delivery Message with Tag='3' having TEK included in a Data field to the CP-E 21 in the BSA 20 in step 320. In response, the BSA 20 transmits a TEK Delivery Confirm Message with Tag='4' to the BSM 40 in step 330. In an exemplary embodiment, a Status field is set to '0' indicating normal receipt of TEK. If reception of the TEK is failed, the Status field is set to '1'.

Figure 4:
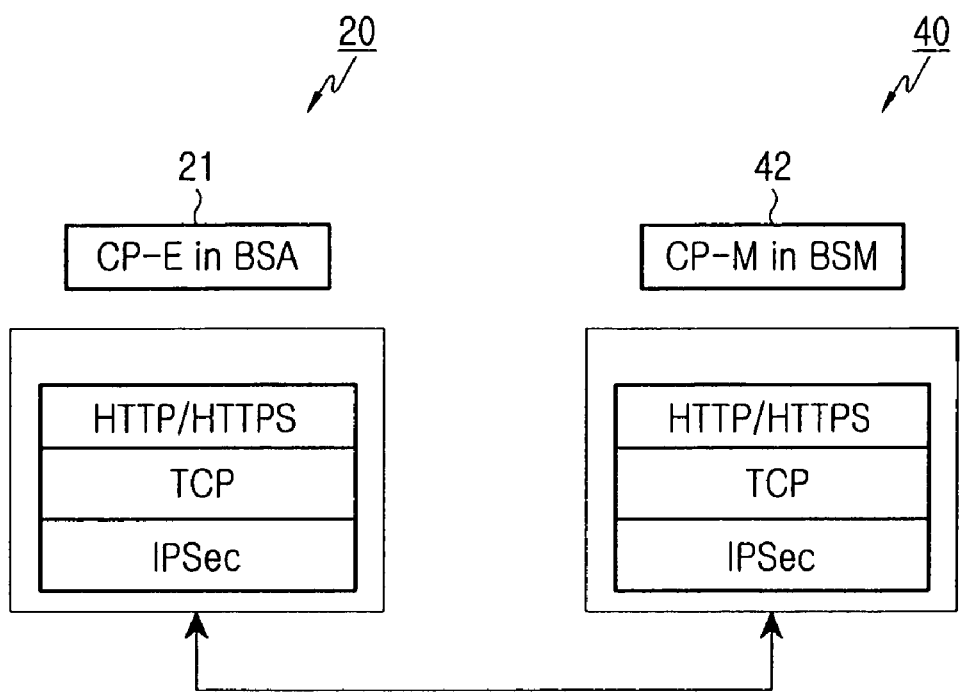
FIG. 4 is a diagram illustrating a protocol stack constituting an interface between a BSA and a BSM according to an exemplary embodiment of the present invention.

FIG. 4 illustrates a protocol stack constituting an interface between a BSA 20 and a BSM 40 according to an exemplary embodiment of the present invention. Referring to FIG. 4, the BSA 20 and the BSM 40 can exchange data by achieving compatibility with each other using a protocol. Data delivery protection between the BSA 20 and the BSM 40 can realize data protection without restriction of protocol and data of an upper layer using IPSec. TCP protocol and HTTP/HTTPS exist as an IPSec upper layer, and the CP-E 21 in the BSA 20 and the CP-M 42 in the BSM 40 exist thereon for message exchange and an associated operation for the interface.

Figure 5A:
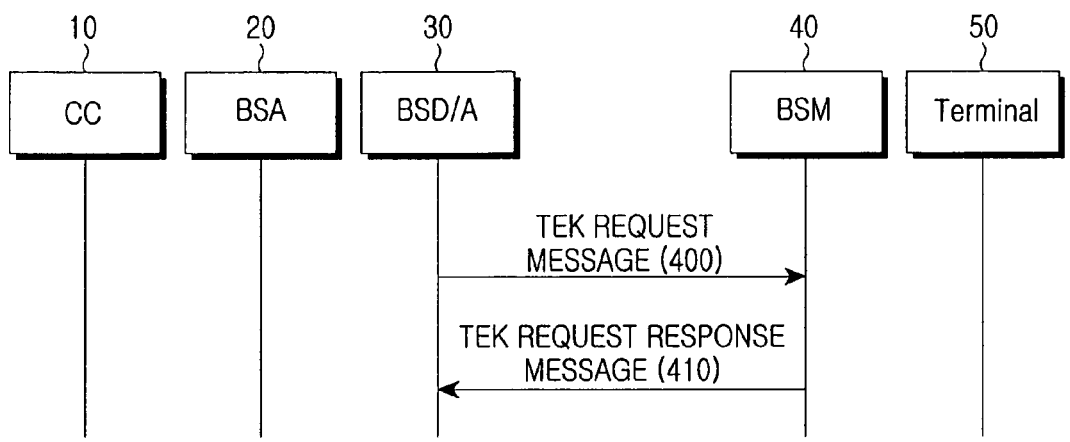
FIGS. 5A and 5B are diagrams illustrating a method for acquiring TEK by a BSD/A for Service Protection according to an exemplary embodiment of the present invention.
Figure 5B:
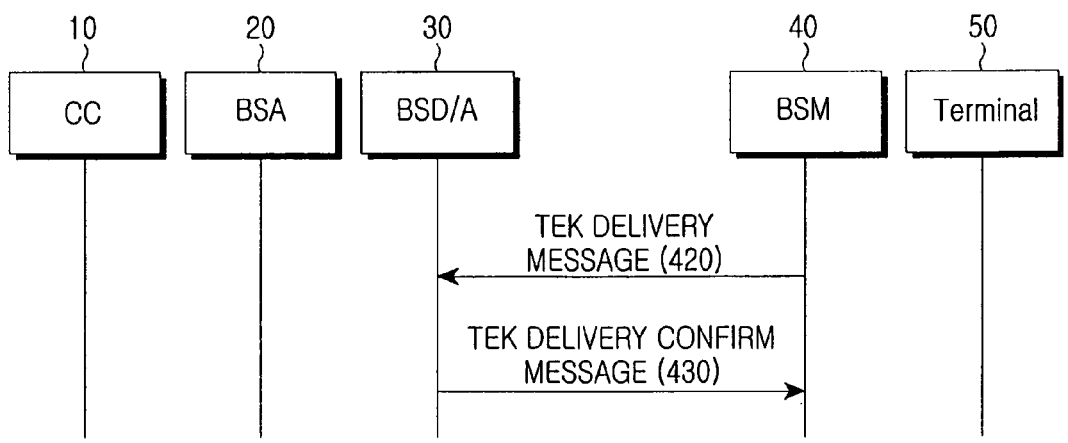

FIGS. 5A and 5B illustrate a TEK acquisition method in which a BSD/A 30 encrypts and broadcasts a service for Service Protection according to an exemplary embodiment of the present invention.

Referring to FIG. 5A, the SP-E 31 in the BSD/A 30 transmits a TEK Request Message to the BSM 40 in step 400. The TEK Request Message has a Tag value '1', and its Destination and Source indicate the BSM 40 and the BSD/A 30, respectively. In response to the TEK Request Message, the BSM 40 transmits a TEK Request Response Message with Tag='2' in step 410. The BSM 40 sets a Status value to '0' when it transmits the requested TEK. Otherwise, the BSM 40 sets the Status value to '1'. When the Status value is set to '0', TEK is stored in a Data field of the TEK Request Response Message.

In an exemplary embodiment shown in FIG. 5B, the BSM 40 directly transmits TEK without a request from the BSD/A 30. Referring to FIG. 5B, the SP-M 41 in the BSM 40 transmits a TEK Delivery Message with Tag='3' having TEK included therein to the BSD/A 30 in step 420. In response, the BSD/A 30 transmits a TEK Delivery Confirm Message with Tag='4' to the BSM 40 in step 430. If the BSD/A 30 has succeeded in receiving the TEK, it sets a Status value of the TEK Delivery Confirm Message to '0'. However, if the BSD/A 30 has failed in receiving the TEK, it sets the Status value '1'.

Figure 6:
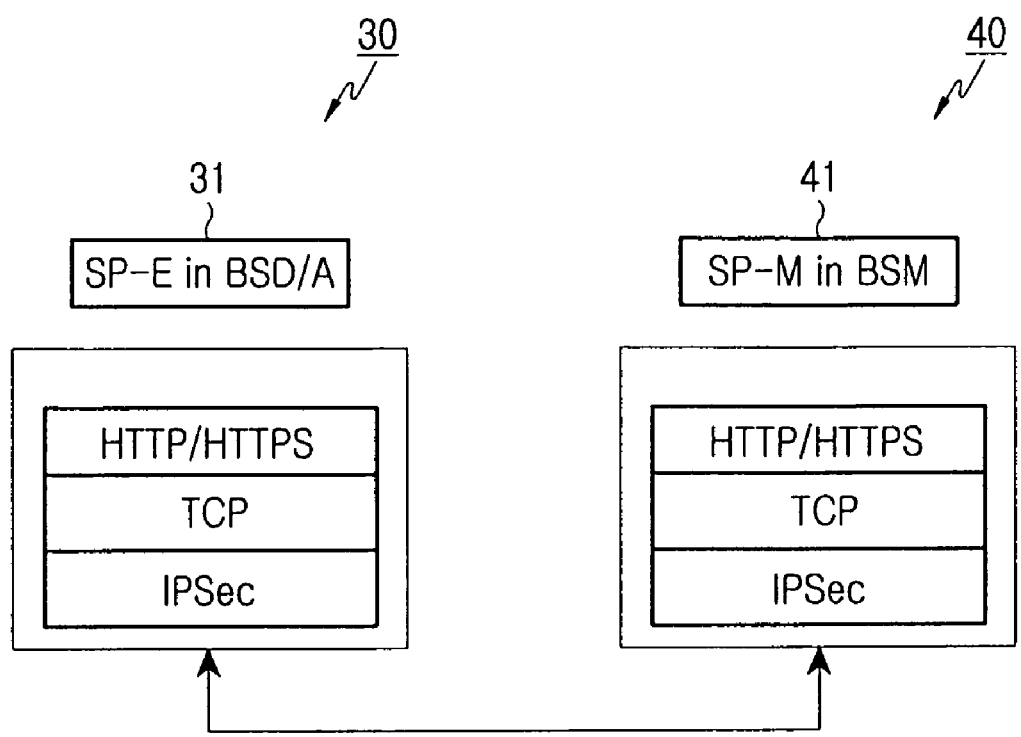
FIG. 6 is a diagram illustrating a protocol stack for an interface between a BSD/A and a BSM for Service Protection according to an exemplary embodiment of the present invention.

FIG. 6 is a diagram illustrating a protocol stack for an interface between a BSD/A 30 and a BSM 40 for Service Protection according to an exemplary embodiment of the present invention. Safety between interfaces is protected using IPSec, and a protocol related to a service protection method is transmitted through TCP and HTTP/HTTPS. Encryption information transmitted from the BSM 40 is managed by the BSD/A 30, and the encryption information includes RKM, LTKM, STKM and TEK.

Figure 7A:
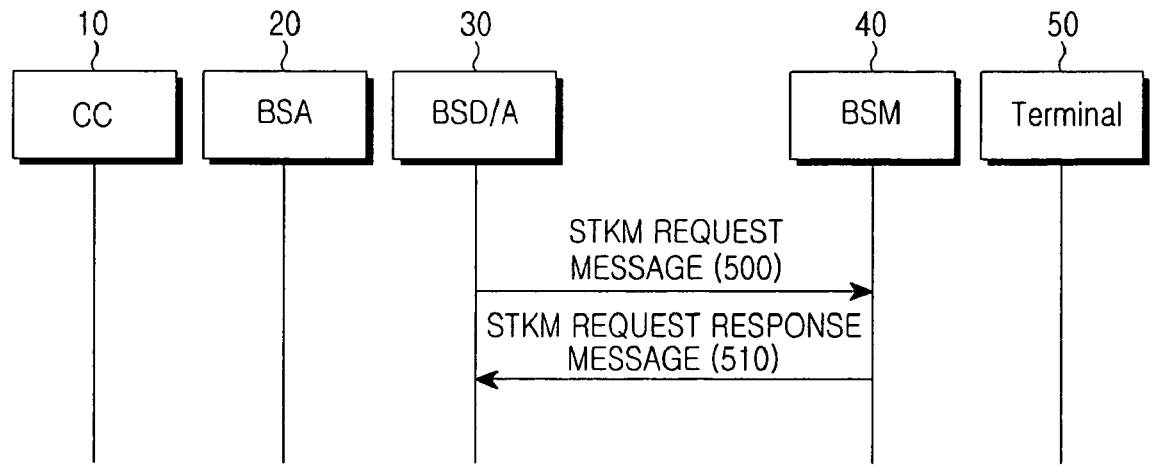
FIGS. 7A and 7B are diagrams illustrating a method for acquiring STKM by a BSD/A according to an exemplary embodiment of the present invention.
Figure 7B:
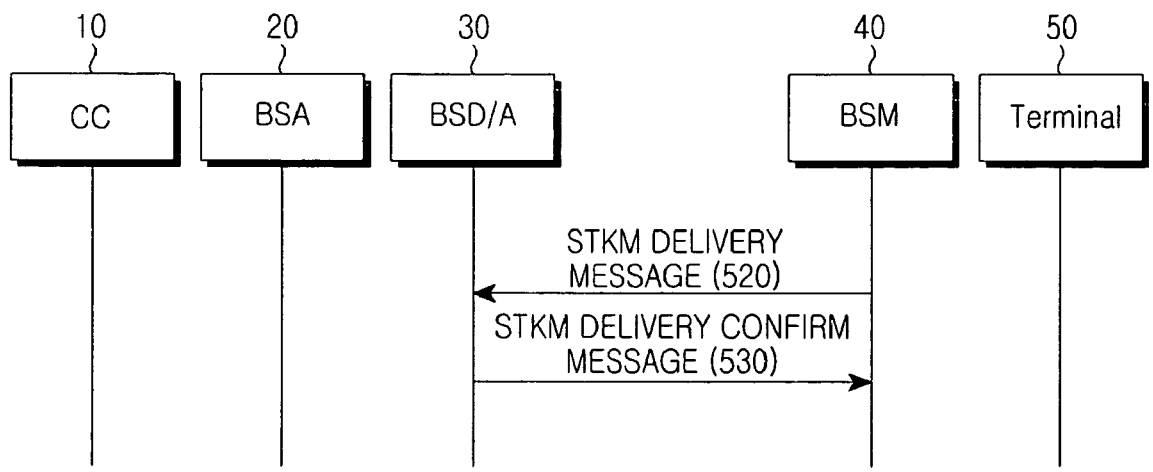

FIGS. 7A and 7B are diagrams illustrating a method for acquiring STKM by the BSD/A 30 according to an exemplary embodiment of the present invention. This exemplary method can be applied for Service and/or Content Protection. The STKM is an encryption key with which a terminal can decrypt the service or contents encrypted by the BSD/A 30. The STKM can be delivered from the BSM 40 to a Terminal 50 over an interaction channel. However, in the broadcast channel environment, the STKM should be delivered from the BSD/A 30 to a Terminal 50 over a broadcast channel.

Referring to FIG. 7A, the BSD/A 30 transmits an STKM Request Message to the BSM 40 in step 500. In the BSM 40, an entity for processing the message can be the SP-M 41 for Service Protection and/or the CP-M 42 for Content Protection. The STKM Request Message has a Tag value '5', and its Destination and Source indicate the BSM 40 and the BSD/A 30, respectively. In response to the STKM Request Message, the BSM 40 transmits an STKM Request Response Message with Tag='6' in step 510. When the BSM 40 transmits the requested STKM, it sets a Status value to '0' and a Data field to STKM. Otherwise, when the BSM 40 cannot transmit the STKM, it sets the Status value to '1'.

In an exemplary embodiment shown in FIG. 7B, the BSM 40 directly transmits STKM without a request from the BSD/A 30. The BSM 40 transmits an STKM Delivery Message with Tag='7' having STKM included therein to the BSD/A 30 in step 520. In response, the BSD/A 30 transmits an STKM Delivery Confirm Message with Tag='8' to the BSM 40 in step 530. If the BSD/A 30 has succeeded in receiving the STKM, it sets a Status value of the STKM Delivery Confirm Message to '0'. However, if the BSD/A 30 has failed in receiving the STKM, it sets the Status value '1'.

For Service Protection, this process is managed by the SP-KD 32 in the BSD/A 30 and the SP-M 41 in the BSM 40. For Content Protection, this process is managed by the FD 33 in the BSD/A 30 and the CP-M 42 in the BSM 40.

Figure 8A:
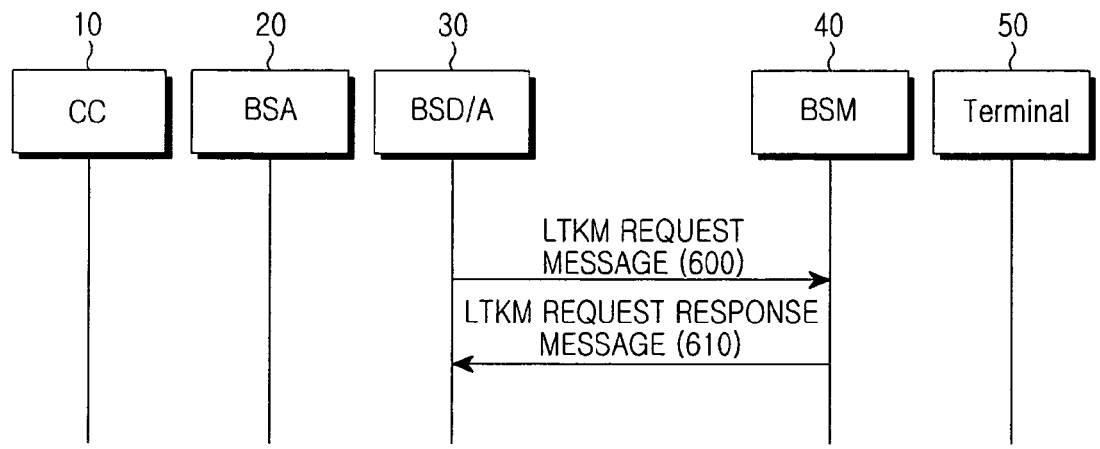
FIGS. 8A and 8B are diagrams illustrating a method for acquiring LTKM by a BSD/A according to an exemplary embodiment of the present invention.
Figure 8B:
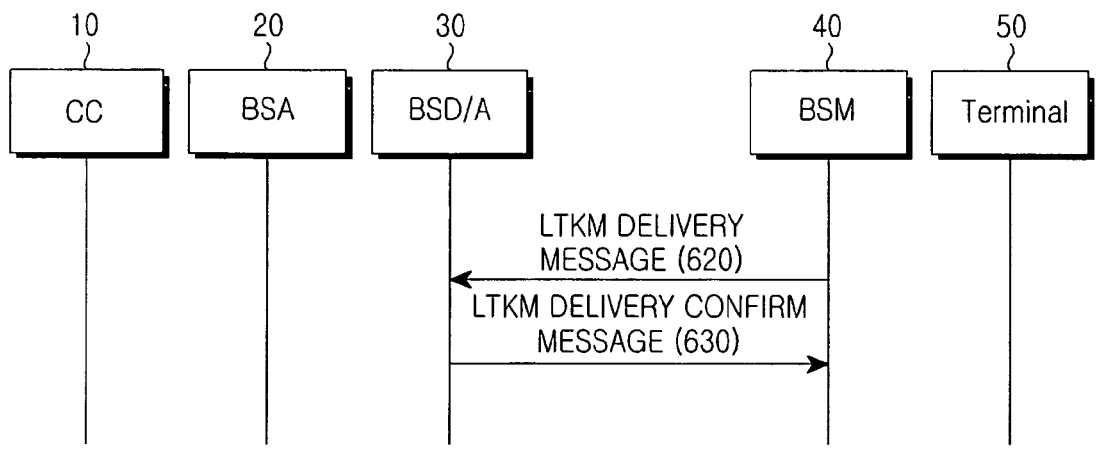

FIGS. 8A and 8B are diagrams illustrating a method for acquiring LTKM by a BSD/A 30 according to an exemplary embodiment of the present invention. In the service/content protection method, LTKM information is exchanged using a broadcast channel. The LTKM can be delivered from the BSM 40 to the Terminal 50 over an interaction channel. However, in the broadcast channel environment, the LTKM should be delivered from the BSD/A 30 to a Terminal 50 over the broadcast channel.

Referring to FIG. 8A, the BSD/A 30 transmits an LTKM Request Message to the BSM 40 in step 600. The LTKM Request Message has a Tag value '9', and its Destination and Source indicate the BSM 40 and the BSD/A 30, respectively. In response to the LTKM Request Message, the BSM 40 transmits an LTKM Request Response Message with Tag='10' in step 610. When the BSM 40 intends to transmit the requested LTKM, it sets a Status value to '0'. Otherwise, the BSM 40 sets the Status value to F. When the Status value is set to '0', LTKM is stored in a Data field. When the Status value is set to '1', the LTKM Request Response Message is transmitted without the Data field.

In the case of FIG. 8B, the BSM 40 directly transmits LTKM without a response from the BSD/A 30. In this case, the BSM 40 transmits an LTKM Delivery Message with Tag='11' having LTKM included therein to the BSD/A 30 in step 620. In response, the BSD/A 30 transmits an LTKM Delivery Confirm Message with Tag='12' to the BSM 40 in step 630. If the BSD/A 30 has succeeded in receiving the LTKM, it sets a Status value of the LTKM Delivery Confirm Message to '0'. However, if the BSD/A 30 has failed in receiving the LTKM, it sets the Status value to '1'.

For Service Protection, this process is managed by the SP-KD 32 in the BSD/A 30 and the SP-M 41 in the BSM 40. For Content Protection, this process is managed by the FD 33 in the BSD/A 30 and the CP-M 42 in the BSM 40.

Figure 9A:
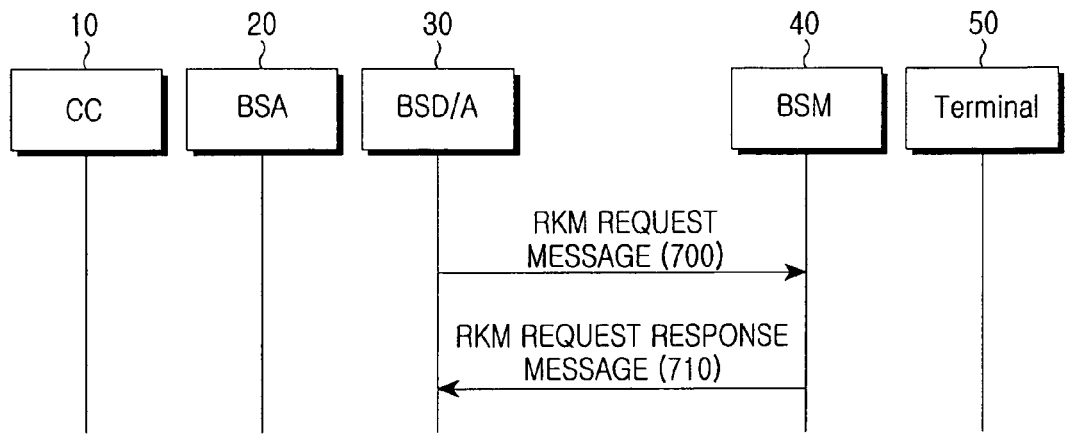
FIGS. 9A and 9B are diagrams illustrating a method for acquiring RKM by a BSD/A for Service Protection and Content Protection according to an exemplary embodiment of the present invention.
Figure 9B:
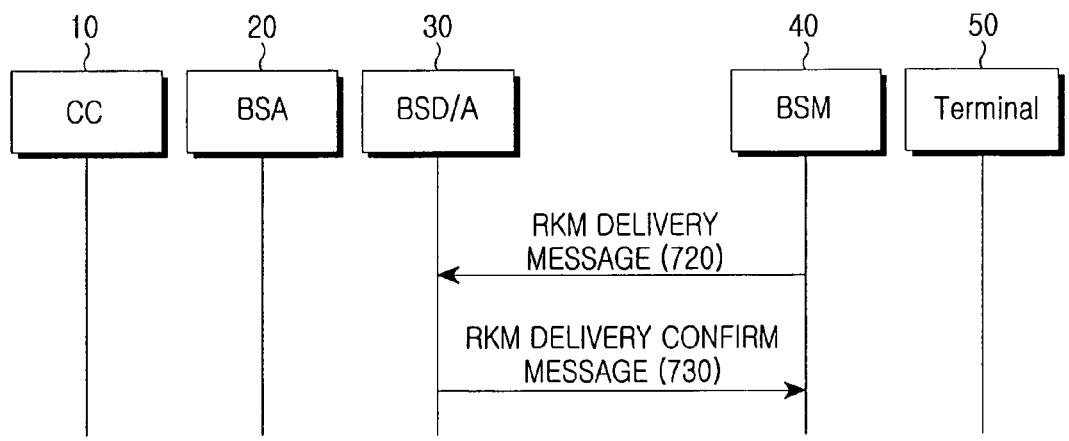

FIGS. 9A and 9B are diagrams illustrating a method for acquiring RKM by a BSD/A 30 for Service Protection and Content Protection according to an exemplary embodiment of the present invention.

RKM can be delivered from the BSM 40 to the Terminal 50 over an interaction channel. However, in the broadcast channel environment, the RKM should be delivered from the BSM 40 to the Terminal 50 over the broadcast channel.

Referring to FIG. 9A, the BSD/A 30 transmits an RKM Request Message to the BSM 40 in step 700. The RKM Request Message has a Tag value '13', and its Destination and Source indicate the BSM 40 and the BSD/A 30, respectively. In response to the RKM Request Message, the BSM 40 transmits an RKM Request Response Message with Tag='14' to the BSD/A 30 in step 710. When the BSM 40 intends to transmit the requested RKM, it sets a Status value to '0'. Otherwise, the BSM 40 sets the Status value to '1'. If the Status value is set to '0', RKM is stored in a Data field before being transmitted. However, if the Status value is set to '1', the RKM Request Response Message is transmitted without the Data field.

In the case of FIG. 9B, the BSM 40 directly transmits RKM without a request from the BSD/A 30. In an exemplary embodiment, the BSM 40 transmits an RKM Delivery Message with Tag='15' having RKM included therein to the BSD/A 30 in step 720. In response, the BSD/A 30 transmits an RKM Delivery Confirm Message with Tag='16' to the BSM 40 in step 730. If the BSD/A 30 has succeeded in receiving the RKM, it sets a Status value of the RKM Delivery Confirm Message to '0'. However, if the BSD/A 30 has failed in receiving the RKM, it sets the Status value to '1'.

For Service Protection, this process is managed by the SP-KD 32 in the BSD/A 30 and the SP-M 41 in the BSM 40. For Content Protection, this process is managed by the FD 33 in the BSD/A 30 and the CP-M 42 in the BSM 40.

Figure 10:
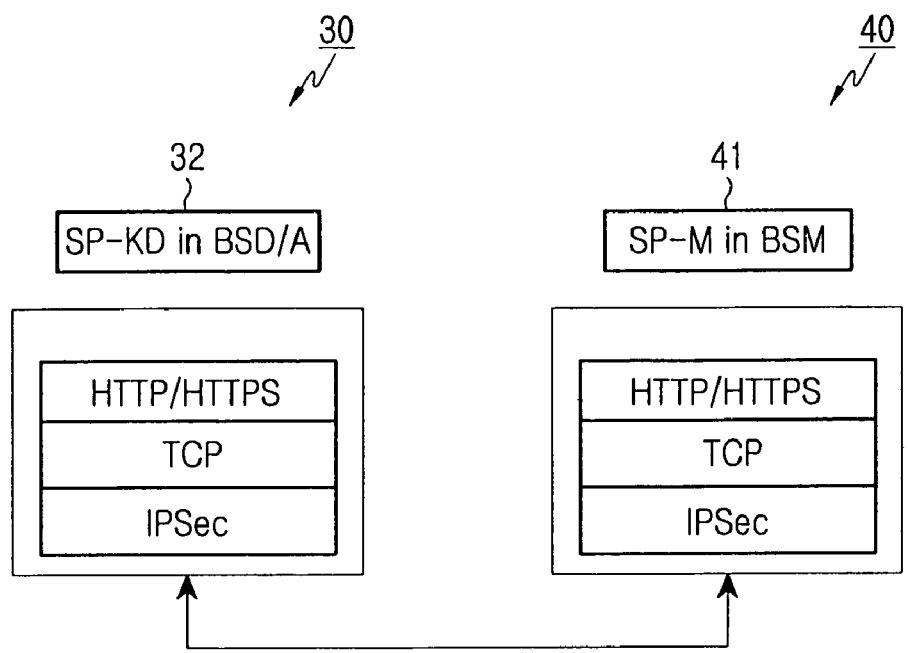
FIG. 10 is a diagram illustrating a protocol stack for an interface between a BSD/A and a BSM for Service Protection according to an exemplary embodiment of the present invention.

FIG. 10 illustrates a protocol stack for an interface between a BSD/A 30 and a BSM 40 for Service Protection according to an exemplary embodiment of the present invention. Safety between interfaces is protected using IPSec, and a protocol related to a service protection method is transmitted through TCP and HTTP/HTTPS. Associated encryption information includes TEK, STKM, LTKM and RKM.

Figure 11:
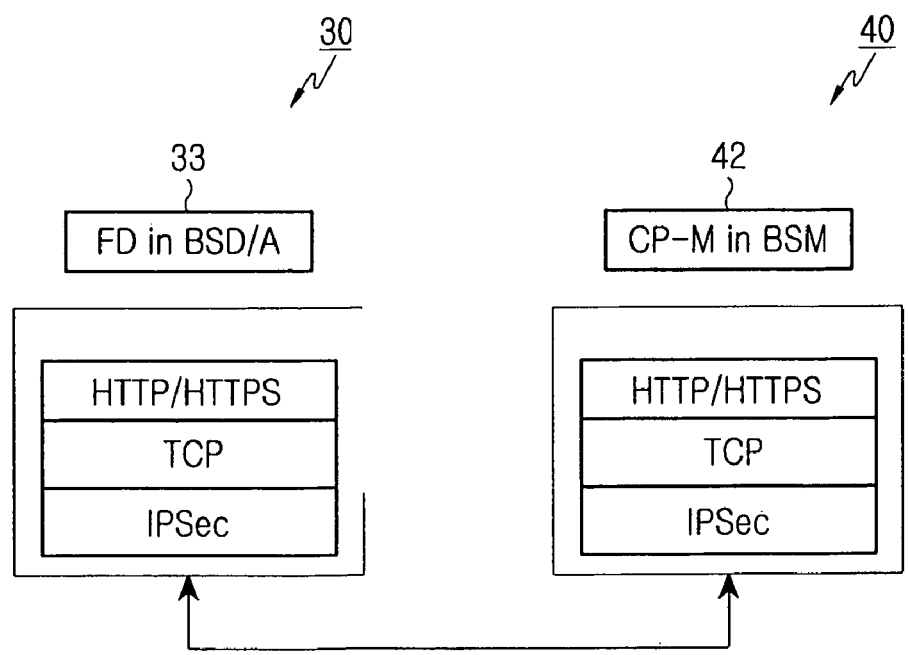
FIG. 11 is a diagram illustrating a protocol stack for an interface between a BSD/A and a BSM for Content Protection according to an exemplary embodiment of the present invention.

FIG. 11 illustrates a protocol stack for an interface between a BSD/A 30 and a BSM 40 for Content Protection according to an exemplary embodiment of the present invention. Safety between interfaces is protected using IPSec, and a protocol related to a content protection method is transmitted through TCP and HTTP/HTTPS. Associated encryption information includes STKM, LTKM and RKM.

Figure 12:
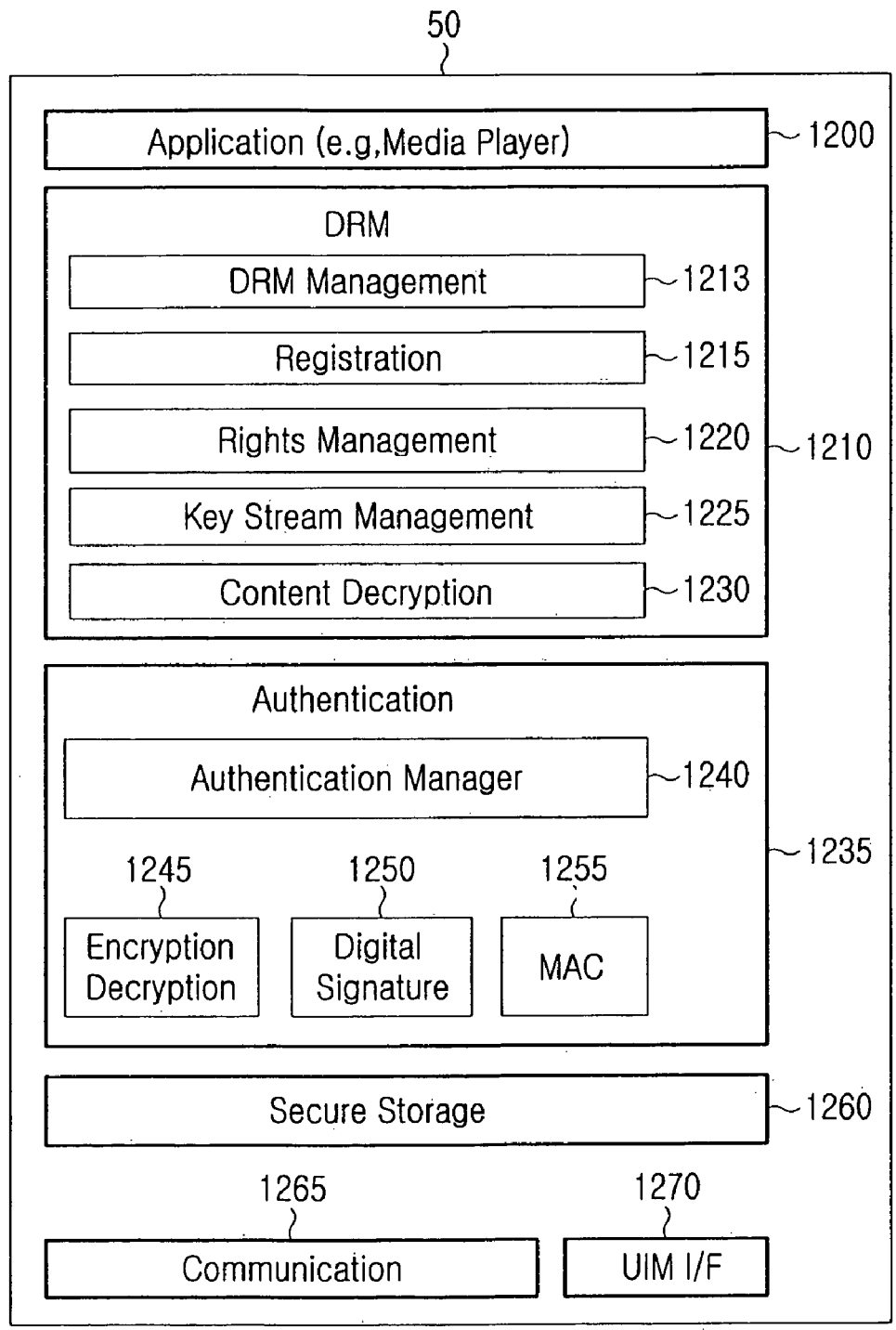
FIG. 12 is a diagram illustrating a Terminal in a mobile broadcast system according to an exemplary embodiment of the present invention.

With reference to FIG. 12, a description will now be made of a Terminal 50 according to an exemplary embodiment of the present invention.

As illustrated in FIG. 12, a Terminal 50 according to an exemplary embodiment of the present invention comprises an Application module 1200, a DRM module 1210, an Authentication module 1235, a Secure Storage module 1260, a Communication module 1265, and a User Identity Module Interface (UIM I/F) module 1270.

Specifically, the Application module 1200, which may be a module like Media Player™, serves to reproduce decrypted contents provided from the DRM module 1210, and the DRM module 1210 serves to manage registration, service subscription, and content use.

The DRM module 1210 may include a DRM Management module 1213, a Registration module 1215, a Rights Management module 1220, a Key Stream Management module 1225, and a Content Decryption module 1230. Of the modules, the Registration module 1215 performs a registration operation, and the Rights Management module 1220 manages analysis and use of the Rights information acquired during service subscription. The Key Stream Management module 1225 performs an operation of decrypting the encrypted traffic key with a service key, and the Content Decryption module 1230 performs an operation of decrypting the encrypted contents with a traffic key. The entire operation of the DRM-related modules is performed under the control of the DRM Management module 1213.

The Authentication module 1235 manages authentication protocol execution with a user identification module and a network, for example, a service provider, and performs message generation and verification using its lower module. The Authentication module 1235 may include an Authentication Manager 1240 for taking charge of the overall protocol execution and managing an authentication function, an Encryption Decryption module 1245 for performing an encryption/decryption operation with its lower module, a Digital Signature module 1250 for managing electronic signature, and a MAC module 1255 for performing a MAC operation.

Specifically, the DRM module 1210 and the Authentication module 1235 acquire a group key by verifying the Registration Response Message received from the BSM 40 according to an exemplary embodiment of the present invention, and acquire Rights information from the Service Subscription Response Message received from the BSM 40 using the group key. In addition, upon receipt of a Traffic Key Message from the BSD/A 30, the DRM module 1210 and the Authentication module 1235 acquire a traffic key using the Rights information, and decrypt the encrypted service transmitted from the BSD/A 30 using the acquired traffic key.

The Communication module 1265, in charge of communication with a network, receives a message from the network and transmits a response message associated in response to the received message. Specifically, the Communication module 1265 receives a message from the BSD/A 30 over a broadcast channel according to an embodiment of the present invention. According to another exemplary embodiment of the present invention, the Communication module 1265 exchanges messages with the BSM 40 over an interaction channel, and receives the Traffic Key Message and the encrypted service from the BSD/A 30.

The Secure Storage module 1260 stores encryption keys, and the UIM I/F module 1270 takes charge of communication with a User Identity Module (UIM) (not shown).

As can be understood from the foregoing description, the present invention provides interfaces for transmitting encryption information between entities, thereby providing reliable Service/Content Protection for broadcast service.

While the invention has been shown and described with reference to exemplary embodiments thereof, it will be understood by those skilled in the art that various changes in form and details may be made therein without departing from the spirit and scope of the invention as defined by the appended claims.

The invention claimed is:

1. A method for transmitting/receiving encryption information by a broadcast (BCAST) Service Distribution/Adaptation (BSD/A) unit in a mobile broadcast system providing a BCAST service, the method comprising:
   transmitting a Registration Key Material (RKM) request message for requesting delivery of an RKM for registration of the BCAST service of a terminal to a BCAST Subscription Management (BSM) unit managing subscriber information of the terminal;
   receiving an RKM request response message from the BSM;
   transmitting a Long-Term Key Message (LTKM) request message for requesting delivery of an LTKM provided to the terminal during subscription of the BCAST service to the BSM unit;
   receiving an LTKM request response message from the BSM unit;
   transmitting a Short-Term Key Message (STKM) request message for acquisition of an STKM including a Traffic Encryption Key (TEK) used for decryption of the BCAST service by the terminal to the BSM unit; and
   receiving an STKM request response message from the BSM unit,
   wherein the RKM request message includes an identifier (ID) of the BCAST service, and the RKM request response message includes the ID of the BCAST service and the RKM,
   wherein the LTKM request message includes the ID of the BCAST service and, and the LTKM request response message includes the ID of the BCAST service and the LTKM, and
   wherein the STKM request message includes the ID of the BCAST service, and the STKM request response message includes the ID of the BCAST service and the STKM.

2. The method of claim 1, wherein each of the RKM, LTKM, STKM request messages includes information about a tag indicating a message type, a version of standard supported by a message, a message ID, an ID of the BSM unit corresponding to a destination ID, an ID of the BSD/A unit corresponding to a source ID, and a time when the message is transmitted.

3. The method of claim 1, wherein each of the RKM, LTKM, STKM request response messages includes information about a tag indicating a message type, a version of standard supported by a message, a message ID, an ID of the BSD/A unit corresponding to a destination ID, an ID of the BSM unit corresponding to a source ID, a time when the message is transmitted, and status information indicating a response result of the message.

4. A method for transmitting/receiving encryption information by a broadcast (BCAST) Subscription Management (BSM) unit in a mobile broadcast system providing a BCAST service, the method comprising:
   transmitting a Registration Key Material (RKM) delivery message for delivery of an RKM for registration of the BCAST service of a terminal to a BCAST Service Distribution/Adaptation (BSD/A) unit;

receiving an RKM delivery confirmation message indicating success/failure in receipt of the RKM delivery message, from the BSD/A unit;

transmitting a Long-Term Key Message (LTKM) delivery message for delivery an LTKM provided to the terminal during subscription of the BCAST service to the BSD/A unit;

receiving an LTKM delivery confirmation message indicating success/failure in receipt of the RKM delivery message from the BSD/A unit;

transmitting a Short-Term Key Message (STKM) delivery message for delivery an STKM including a Traffic Encryption Key (TEK) used for decryption of the BCAST service by the terminal to the BSD/A unit; and receiving an STKM delivery confirmation message indicating success/failure in receipt of the STKM delivery message from the BSD/A unit, wherein the RKM delivery message includes an identifier (ID) of the BCAST service and the RKM, and the RKM delivery confirmation message includes the ID of the BCAST service, wherein the LTKM delivery message includes the ID of the BCAST service and the LTKM, and the LTKM delivery confirmation message includes the ID of the BCAST service, and wherein the STKM delivery message includes the ID of the BCAST service and the STKM, and the STKM delivery confirmation message includes the ID of the BCAST service.

5. The method of claim 4, wherein each of the RKM, LTKM, STKM delivery messages includes information about a tag indicating a message type, a version of standard supported by a message, a message ID, an ID of the BSD/A unit corresponding to a destination ID, an ID of the BSM unit corresponding to a source ID, a time when the message is transmitted, and a target terminal of the message.

6. The method of claim 4, wherein each of the RKM, LTKM, STKM delivery confirmation messages includes information about a tag indicating a message type, a version of standard supported by a message, a message ID, an ID of the BSM unit corresponding to a destination ID, an ID of the BSD/A unit corresponding to a source ID, a time when the message is transmitted, and status information indicating a response result of the message.

7. A method for transmitting/receiving encryption information by a broadcast (BCAST) Subscription Management (BSM) unit in a mobile broadcast system providing a BCAST service, the method comprising:

receiving a Registration Key Material (RKM) request message for requesting delivery of an RKM for registration of the BCAST service of a terminal, from a BCAST Service Distribution/Adaptation (BSD/A) unit;

transmitting an RKM request response message to the BSD/A;

receiving a Long-Term Key Message (LTKM) request message for requesting delivery of an LTKM provided to the terminal during subscription of the BCAST service, from the BSD/A unit;

transmitting an LTKM request response message to the BSD/A unit;

receiving a Short-Term Key Message (STKM) request message for acquisition of an STKM including a Traffic Encryption Key (TEK) used for decryption of the BCAST service by the terminal, from the BSD/A unit; and transmitting an STKM request response message to the BSD/A, wherein the RKM request message includes an identifier (ID) of the BCAST service, and the RKM request response message includes the ID of the BCAST service and the RKM, wherein the LTKM request message includes the ID of the BCAST service, and the LTKM request response message includes the ID of the BCAST service and the LTKM, and wherein the STKM request message includes the ID of the BCAST service, and the STKM request response message includes the ID of the BCAST service and the STKM.

8. The method of claim 7, wherein each of the RKM, LTKM, STKM request messages includes information about a tag indicating a message type, a version of standard supported by a message, a message ID, an ID of the BSM unit corresponding to a destination ID, an ID of the BSD/A unit corresponding to a source ID, and a time when the message is transmitted.

9. The method of claim 7, wherein each of the RKM, LTKM, STKM request response messages includes information about a tag indicating a message type, a version of standard supported by a message, a message ID, an ID of the BSD/A unit corresponding to a destination ID, an ID of the BSM unit corresponding to a source ID, a time when the message is transmitted, and status information indicating a response result of the message.

10. A method for transmitting/receiving encryption information by a broadcast (BCAST) Service Distribution/Adaptation (BSD/A) unit in a mobile broadcast system providing a BCAST service, the method comprising:

receiving a Registration Key Material (RKM) delivery message for delivery of an RKM for registration of the BCAST service of a terminal, from a BCAST Subscription Management (BSM) unit;

transmitting an RKM delivery confirmation message indicating success/failure in receipt of the RKM delivery message, to the BSM unit;

receiving a Long-Term Key Message (LTKM) delivery message for delivery an LTKM provided to the terminal during subscription of the BCAST service, from the BSM unit;

transmitting an LTKM delivery confirmation message indicating success/failure in receipt of the RKM delivery message, to the BSM unit;

receiving a Short-Term Key Message (STKM) delivery message for delivery an STKM including a Traffic Encryption Key (TEK) used for decryption of the BCAST service by the terminal, from the BSM unit; and transmitting an STKM delivery confirmation message indicating success/failure in receipt of the STKM delivery message, to the BSM unit, wherein the RKM delivery message includes an identifier (ID) of the BCAST service and the RKM, and the RKM delivery confirmation message includes the ID of the BCAST service, wherein the LTKM delivery message includes the ID of the BCAST service and the LTKM, and the LTKM delivery confirmation message includes the ID of the BCAST service, and wherein the STKM delivery message includes the ID of the BCAST service and the STKM, and the STKM delivery confirmation message includes the ID of the BCAST service.

11. The method of claim 10, wherein each of the RKM, LTKM, STKM delivery messages includes information about a tag indicating a message type, a version of standard supported by a message, a message ID, an ID of the BSD/A unit corresponding to a destination ID, an ID of the BSM unit corresponding to a source ID, a time when the message is transmitted, and a target terminal of the message.

12. The method of claim 10, wherein each of the RKM, LTKM, STKM delivery confirmation messages includes information about a tag indicating a message type, a version of standard supported by a message, a message ID, an ID of the BSM unit corresponding to a destination ID, an ID of the BSD/A unit corresponding to a source ID, a time when the message is transmitted, and status information indicating a response result of the message.

13. The method of claim 1, wherein each of the RKM request message, the RKM request response message, the LTKM request message, the LTKM request response message, the STKM request message, and the STKM request response message further includes an ID of a content.

14. The method of claim 4, wherein each of the RKM delivery message, the RKM delivery confirmation message, the LTKM delivery message, the LTKM delivery confirmation message, the STKM delivery message, and the STKM delivery confirmation message further includes an ID of a content.

15. The method of claim 7, wherein each of the RKM request message, the RKM request response message, the LTKM request message, the LTKM request response message, the STKM request message, and the STKM request response message further includes an ID of a content.

16. The method of claim 10, wherein each of the RKM delivery message, the RKM delivery confirmation message, the LTKM delivery message, the LTKM delivery confirmation message, the STKM delivery message, and the STKM delivery confirmation message further includes an ID of a content.

* * * * *